Feb. 16, 1960 — J. R. KNOWLES — 2,924,873
THERMALLY CONTROLLED COOLANT SUPPLY FOR METAL CUTTING TOOLS
Filed Aug. 28, 1956 — 2 Sheets-Sheet 1
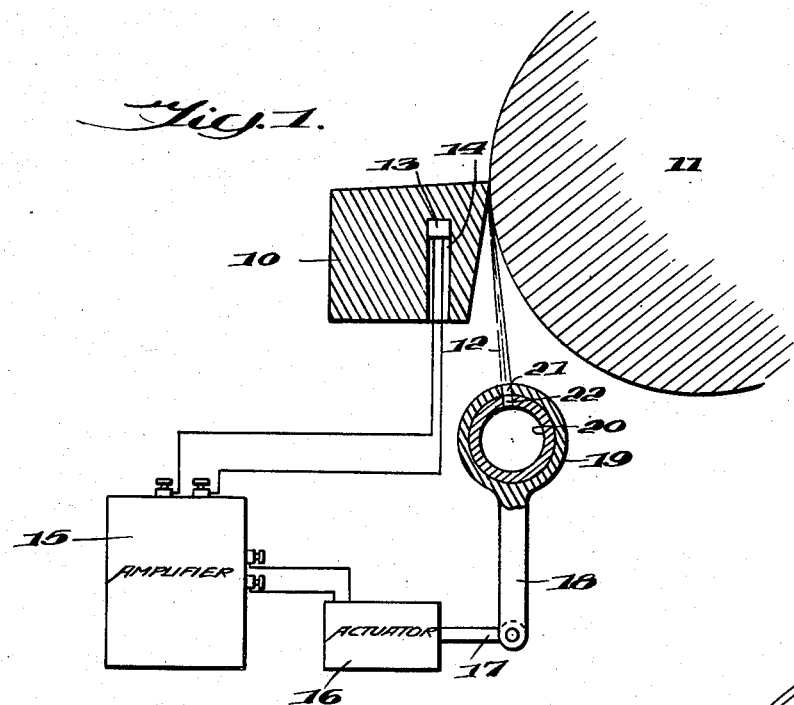
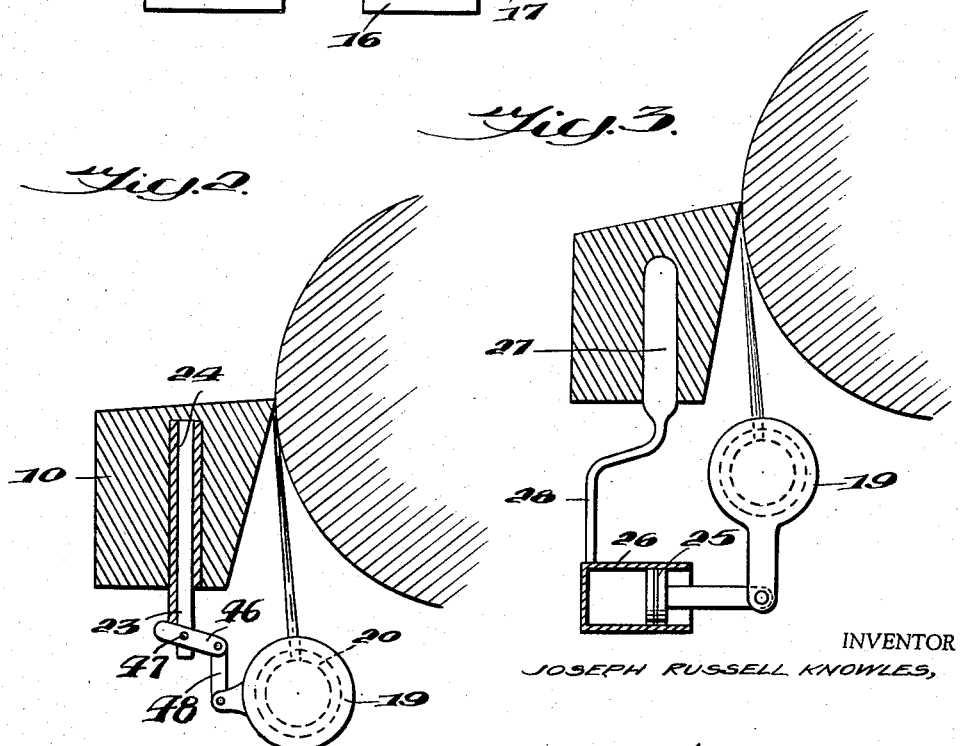
INVENTOR
JOSEPH RUSSELL KNOWLES,
BY
ATTORNEY

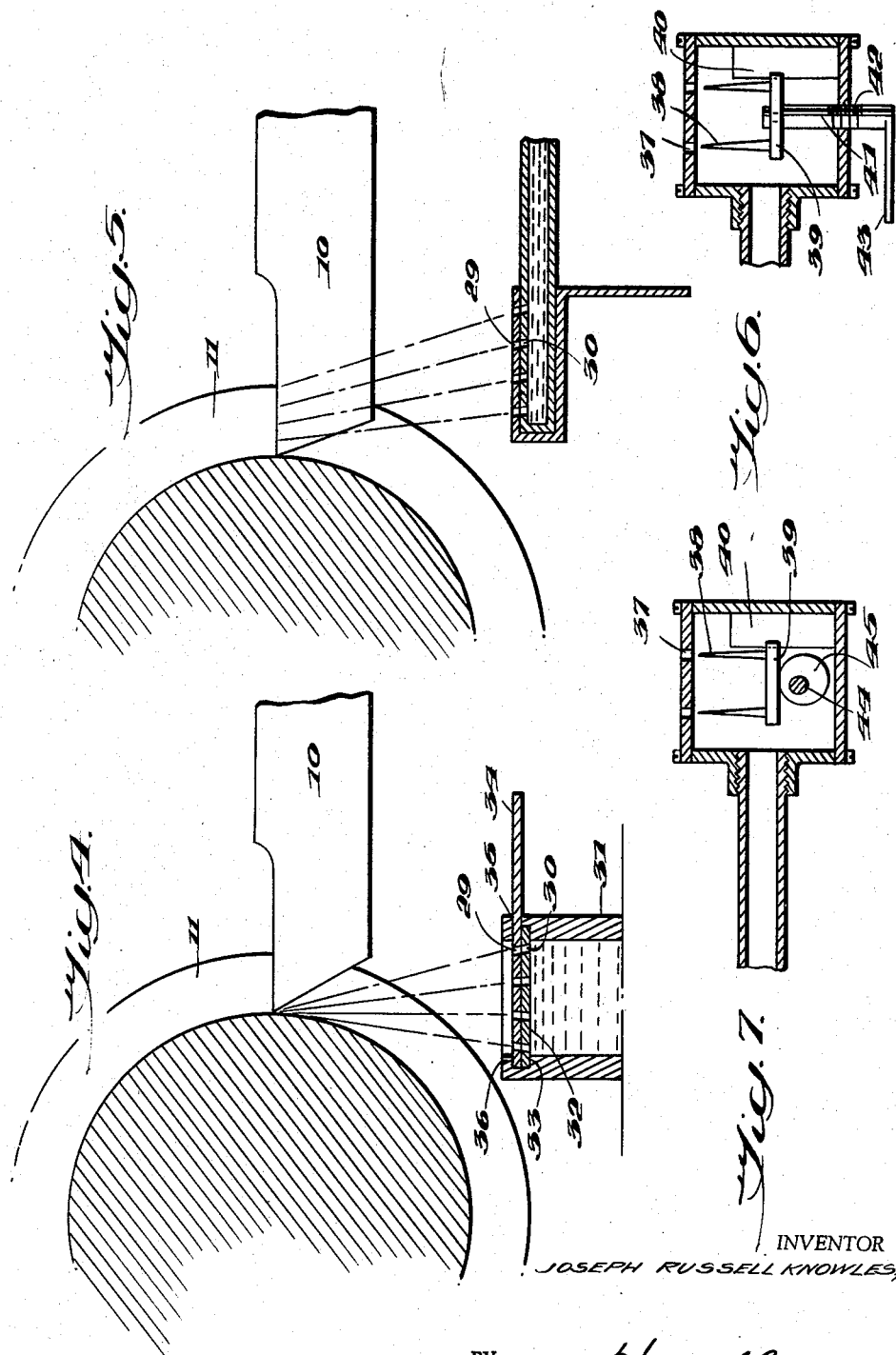

United States Patent Office 2,924,873
Patented Feb. 16, 1960

2,924,873

THERMALLY CONTROLLED COOLANT SUPPLY FOR METAL CUTTING TOOLS

Joseph Russell Knowles, London, England, assignor to Gulf Research & Development Company, Pittsburgh, Pa., a corporation of Delaware Application August 28, 1956, Serial No. 606,750

2 Claims. (Cl. 29—106)

This invention relates to apparatus for automatically regulating the discharge of coolant onto a metal working tool in order to prevent the cutting edge and other local areas of the tool from becoming either too highly heated or too drastically cooled and thus to maintain them at an optimum temperature for efficient cutting action and maximum tool life.

It is known that the materials of some metal working tools cut best at a critical temperature. The heat which is generated in operation may cause the tool to lose hardness and may also promote the build-up of metal particles which become welded to the cutting edge, as well as render the tool more susceptible to cratering in the area rubbed by the chip, all of which contribute to a shortening of the tool life. Cooling, however, may be uneven and erratic, for the resistance encountered by the tool in making the cut is not constant and as pressure of the tool varies in entering the work the cutting edge, or a portion of it, may reach an excessive temperature. So too, the speed of cutting and the characteristics of the metal worked upon are factors which determine the heat generated in cutting.

A constant flow of coolant may accordingly be excessive or insufficient in a particular operation. Drastic or sudden cooling of carbide-tipped tools in particular is likely to produce thermal shock which causes the cemented carbide to erode and thus destroys the cutting edge.

The present invention provides for varying the flow of coolant to a cutting tool automatically in response to changes in its temperature in order that it will be maintained at or near to the optimum temperature for effective action under different or variable operating conditions.

The invention also provides a cutting tool with a thermocouple or other thermally responsive means which causes valves to regulate the flow of coolant which is discharged onto highly heated areas of the tool.

In order to facilitate an understanding of the invention, reference will be made to the several embodiments thereof illustrated in the accompanying drawings. It will be understood at the outset, however, that the invention is not limited to the particular constructions and details herein set forth as exemplary embodiments, as the invention is capable of other modification, and, further, that the phraseology employed is for the purpose of description and not of limitation of the preferred form of invention shown.

In the drawings:

Fig. 1 is a view, partly in transverse section, schematically showing a rotatable valve and thermocouple with associated mechanism for regulating the valve.

Fig. 2 is a similar view showing a rotatable valve which is mechanically actuated by the extension of an element having a high coefficient of thermal expansion, which is inserted in the cutter.

Fig. 3 shows a rotatable valve controlled by movement of a piston, under influence of an expansible fluid which is heated by rising temperature of the tool.

Fig. 4 shows a slide valve for regulating the opening of orifices from which jets may be projected to a focal point on the cutter or to selected points along the cutting edge.

Fig. 5 is a side view, partly in vertical section, showing a valve which may be rotatable, as shown in Figs. 1–3, or slidable.

Fig. 6 shows an arrangement of needle valves for controlling the size of jet orifices by micrometer screw adjustment.

Fig. 7 shows a similar arrangement of needle valves adjusted by rotation of a cam.

Referring more particularly to the drawings wherein, in all modifications, the flow of fluid from nozzles or orifices is controlled by the temperature of the tool through the medium of an interposed thermally responsive mechanism, there is shown in Fig. 1 a cutting tool 10 engaging a workpiece 11, and a coolant jet 12 projected upwardly from beneath the tool through the wedge-shaped clearance space between the tool and workpiece to the apex at the line of cutting contact.

A thermocouple element 13 is attached to the tool as near to the area of maximum temperature as is practicable as, for example, in a hole 14 drilled in the tool bit near the cutting edge or nose. Inasmuch as the thermocouple produces a minute electric potential, insufficient to operate a valve, an amplifier 15 is provided which supplies current to an actuator such as a small motor or soleniod 16 for advancing the rod 17 in response to increasing temperature of the tool. The rod is pivotally connected to an arm 18 of the tubular valve sleeve 19 which embraces a pipe or tubular header 20, the sleeve and header having ports 21 and 22 which in normal operation are not in full registry but which open to maximum extent if excessive heat is generated so that the greater discharge of coolant will reduce the temperature of the tool to a degree at which cutting is best performed. Similarly, if cooling under normal operating conditions is too great, the valve is automatically moved to vary the discharge orifice and reduce the flow of coolant. Reverse movement of the rod 17 can be produced by spring means acting in a direction opposite to that of the energized actuator, or by any other suitable means which will permit gradual valve movement for varying the orifice.

In Fig. 2, the movement of the similar valve sleeve 19 on the fixed pipe or header 20 is controlled mechanically by the elongation and contraction of an element 24, here shown as a sleeve which may be of copper or other material having a suitable coefficient of linear expansion, surrounding an Invar rod 23 and embedded in the tool 10. A level 46, which has its fulcrum on rod 23 at pivot point 47, is engaged by the end of sleeve 24 and operates through link 48 to actuate the valve 19.

In another embodiment, shown in Fig. 3, the rotatable valve sleeve 19 is connected to a piston 25 which fits in a cylinder 26. The piston is reciprocated to various positions by the pressure of a volatile fluid which is contained in a bulb 27 or cavity within the tool and which connects to the closed end of the cylinder through tubing 28.

In the aforesaid modifications of the invention the orifice in the movable sleeve 19 is shifted with respect to the fixed orifice in the header 20. Since the stream or jet of coolant will be of maximum size only when the cutting tool is excessively heated, the circular orifices normally overlap slightly to restrict the opening, their overlapping producing a lune shaped aperture. Each orifice, however, is relatively small, i.e. about 0.014 inch; therefore, even if an extreme condition were encountered calling for variation of the orifice from fully open to fully closed position, i.e. from maximum discharge to no discharge at all, the center of the stream could not have a movement exceeding 0.007 inch. This is within the limits of accuracy permitted in initially directing the jet, an adjustment which is performed manually. In practice, however, the normal opening would be intermediate the fully open and fully closed positions, say about half way, in which case the deviation of the jet axis in either direction from the normal position would be only about 0.0035 inch.

In Fig. 4, the orifices 29 and 30 are formed in plates or other plane elements, the surfaces of which lie in contact with each other and one of which is slidable with respect to the other. The multiple orifices may be arranged to project a plurality of jets to a focal point, as in Fig. 4, or to several points along the cutting edge of the tool, as shown in Fig. 5. In this embodiment the coolant is discharged from a conduit 31 which is provided with a cap plate 32 seating on an internal annular shoulder 33. A plate 34 which has orifices 29 corresponding to orifices 30 in the cap plate extends through a slot 35 on the wall of the conduit and at a diametrically opposite point it enters an internal groove in the conduit and is retained by the overhanging shoulder 36. Sliding movement of the plate 34 relative to the fixed cap plate 32 varies the orifice opening. Such movement is controlled by a thermally responsive means such as is described above.

As shown in Fig. 5, the tubular conduit having orifices or ports 30 and arranged as in Figs. 1 to 3 is closed at its end and is provided with a close-fitting sleeve having ports 29 and from which an integral arm projects. As the arm is swung under the influence of the thermally responsive device, the registry of ports 29 and 30 is varied. The registry of these ports also may be varied by moving the arm and its connected sleeve lengthwise of the fluid conduit.

Figs. 6 and 7 illustrate further modifications in which the collant distributor is provided with adjustable needle valves. As shown, these valves control a plurality of orifices, although it is to be understood that single valves may be employed.

In each modification the distributor comprises a housing which has orifices 37 in one wall, presented to the tool. Needle valve elements 38 which project from a common support 39 are adapted to be entered into and withdrawn from the orifices 37. A rib 40 which extends inwardly from the wall of the housing and into a slot in the support 39 serves to guide the needle valve assemblage and to prevent its misalignment with the orifices. In the form of the invention shown in Fig. 6 the support 39 is pivoted on stem 41 and adjustment is effected by a worm gear thread 42 as the arm 43 on the lower end of the stem is swung by some such thermally responsive means as has heretofore been described. The needle valve assemblage of Fig. 7 is similarly guided in movement to restrict or open the orifices 37, such movement in this case being caused by rotation of a shaft 44 which extends into the housing and mounts a cam 45 bearing upon the support 39. The rotary motion required for valve adjustment may be imparted by rotation from an actuating motor which is controlled by thermal changes in the cutting tool or it may be translated to rotation from a reciprocatory movement of the actuator.

Various other modifications are within the purview of the invention, such as the employment of a fixed orifice and a by-pass valve upstream thereof between the orifice and pump, the by-pass valve being operated by the thermally responsive element to control the flow of coolant to the orifice. Also, an iris-diaphragm type of orifice consisting of overlapping leaves which define a central opening will provide a stream of variable size as required to maintain the tool at substantially constant temperature.

The invention hereinbefore described is useful either alone or in conjunction with a high velocity jet continuously applied to the cutting edge of the tool and the coolant employed may be either liquid, gaseous, or powdered within the contemplation of the term "fluid" as used herein. Also, although the illustrated embodiments are lathe cutting tools it will be understood that the invention includes the adaptation of the disclosed constructions to all metal working operations which involve cutting or grinding.

What I claim as my invention is:

1. In combination with a metal working total and associated means for discharging a stream of coolant thereto, the improvement comprising a tubular conduit closed at its end and having an orifice in its wall directed to the cutting edge of the tool, a tubular sleeve mounted for movement on said conduit, said sleeve having an orifice in its wall adapted to be brought into registry with the orifice in said conduit for varying the effective size thereof as the sleeve is moved, thermally responsive means mounted in heat conductive relationship to the tool, and means controlled by said thermally responsive means for actuating said movable sleeve in accordance with temperature changes in the tool, whereby the effective size of the orifice is varied with tool temperature changes and the flow of coolant is thereby regulated to maintain the tool at optimum temperature in use.

2. Apparatus for maintaining the cutting tool of a lathe at optimum temperature during use, comprising a cutting tool formed with a recess in proximity to its cutting edge, a rod of material having a low coefficient of expansion entered into such recess and projecting outwardly therebeyond, a sleeve of material having a high coefficient of expansion fitted upon said rod and in heat conductive contact with the wall of the recess, said sleeve having a part extending outwardly of said recess, a lever pivoted to the projecting portion of said rod and bearing on the outwardly extending part of said sleeve, whereby upon elongation of said sleeve by conduction of heat thereto from the tool the said lever is moved about its pivot, a conduit for fluid coolant having an orifice therein directed to the cutting edge on the tool, means including a covering orifice adapted to be brought into registry with the first said orifice and adjustable with respect thereto for varying the effective opening through which the coolant fluid is projected to the tool, and means connecting said pivoted lever to said covering orifice means to adjust the same in response to tool temperature changes.

References Cited in the file of this patent

UNITED STATES PATENTS

| | | |
|---|---|---|
| 2,161,570 | Harris | June 6, 1939 |
| 2,255,094 | Aeppli | Sept. 9, 1941 |
| 2,273,698 | Ellis | Feb. 17, 1942 |
| 2,561,043 | Ayers | July 17, 1951 |
| 2,600,453 | Weingart | June 17, 1952 |
| 2,641,047 | Jackman | June 9, 1953 |
| 2,653,517 | Pigott | Sept. 29, 1953 |
| 2,716,368 | Thompson | Aug. 30, 1955 |
| 2,735,443 | Beck | Feb. 21, 1956 |
| 2,756,771 | Spencer | July 31, 1956 |

FOREIGN PATENTS

| | | |
|---|---|---|
| 610,819 | Great Britain | Oct. 21, 1948 |

OTHER REFERENCES

Hausmann-Slack: "Physics," 2nd edition, 18th printing, pages 235–236.